United States Patent [19]

Messerschmidt

[11] Patent Number: 4,759,914

[45] Date of Patent: Jul. 26, 1988

[54] METHOD FOR RECOVERING SILVER FROM WASTE PHOTOGRAPHIC FILM AND PAPER

[75] Inventor: Harold Messerschmidt, Seneca, S.C.

[73] Assignee: Argentum International Incorporated, Pomona, N.Y.

[21] Appl. No.: 113,141

[22] Filed: Oct. 23, 1987

Related U.S. Application Data

[63] Continuation of Ser. No. 640,116, Aug. 13, 1984, abandoned.

[51] Int. Cl.$^4$ .............................................. B01D 11/00
[52] U.S. Cl. ........................................................ 423/39
[58] Field of Search ..................................... 423/38, 39

[56] References Cited

U.S. PATENT DOCUMENTS

| | | | |
|---|---|---|---|
| 1,582,847 | 4/1926 | MacDonald | 423/38 |
| 3,733,256 | 5/1973 | Anderson | 204/109 |
| 4,256,704 | 3/1981 | Howard | 423/38 |
| 4,662,938 | 5/1987 | Whitney et al. | 423/38 |

*Primary Examiner*—R. L. Andrews
*Attorney, Agent, or Firm*—Felfe & Lynch

[57] ABSTRACT

Silver is recovered from photographic emulsion by a process comprising oxidizing whereby the emulsion is oxidized with an acid solution of 10–26 percent ferric chloride at a pH of up to about 2.

9 Claims, No Drawings

METHOD FOR RECOVERING SILVER FROM WASTE PHOTOGRAPHIC FILM AND PAPER

This is a continuation of application Ser. No. 640,116 filed on Aug. 13, 1984, now abandoned.

Silver is a noble metal which like gold has been used since early times as money, or as a base material for the manufacture of jewelry and other precious artifacts for church and home. Unlike gold, however, silver finds also substantial use in industry. Silver metal is needed for the construction of instruments and electronic components, as catalyst in the chemical industry, and with mercury as amalgam in dentistry, but silver is highly prefered in the manufacture of photographic film and paper.

Most photographic films and papers carry as light sensitive agents silver halides embedded in a layer of gelatin. In this "emulsion" a single photon of light can sensitize by catalytic action a billion silver atoms. The sensitization of the silver halide, predominantly silver bromide, is accomplished by exposing the emulsion to light through the lens of a camera or by means of a projector or a transparency, to x-rays or as accomplished only recently by means of computerized laser beams. The picture composed of metallic silver is finally formed by means of a chemical development. This tremendous photographic effect of the photon on silver halides has not been matched by any other method and a fully satisfactory replacement for silver in photography must still be discovered.

Photographic film and paper are well known to the amateur photographer who consumes a substantial volume of this merchandise himself. The average individual is, however, not aware of the much bigger consumption of film and paper by industry. Hospitals and factories, for instance, use large quantities of X-ray film for diagnostic purposes. The graphic arts divisions of the publishing houses producing newspapers, books, pamphlets and bulletins for the dissemination of news, information and knowledge are very substantial consumers of silver for photographic use. Presently this industry is shifting heavily to offset printing using photo-typesetters which consume large amounts of photographic paper, replacing the old fashioned Linotype hot metal typesetters. The motion picture industry still uses black and white motion picture film. A shortage, therefore, of photographic film and paper would severely handicap these industries. A shortage of silver in our modern civilization would be disastrous.

The demand for silver by the photographic industry in the United States has shown a tremendous increase from 1.7 million troy ounces in 1933 to 64 million troy ounces in 1978, an increase of nearly 4000% in 50 years. The total industrial silver consumption in the United States in 1978 was 159 million troy ounces, which means that the photographic industry alone took over 40% of the industrial silver consumed in the United States in 1978. The total silver consumption in the non-communist world during this year was 450 million troy ounces with a shortfall over the shortfall had increased to 34 million troy ounces or 7.4% of the 460 million troy ounces consumed.

The recurring deficits in the world's supply of silver together with increased demand by industry and also from individuals who now acquire silver as an inflation hedge, makes silver recovery from industrial silver wastes not only economically attractive, but essential in view of the threatening silver shortage. Conservation of this natural resource becomes imperative.

The silver to be recovered may be present in different forms: as insoluble silver halide, a soluble silver thiosulfate complex, a silver ion, or elemental silver, depending upon the type of process and the stage at which it is recovered. Much has been accomplished in recovering silver from photographic processing solutions, and the recovery rate can go as high as 98% and above. When most films are processed, much of the silver is removed in the fixing bath as the thiosulfate complex, which is water soluble and from which the silver can be recovered electrolytically. After the film has been fixed it is washed and under the present circumstances the wash water, though low in silver content, still represents a very important source for recovered silver when a high volume is treated.

Black-and-white reversal processing uses a dichromate or permanganate bleach in the present of sulfuric acid. The silver is oxidized to soluble silver sulfate which can be removed from the solution by reducing it to the metallic state through metallic replacement or electrolysis. The silver halide which remains in the emulsion is then exposed to light and developed into metallic silver.

In color photography, both the developed metallic silver as well as the unexposed silver halide must be removed from the final product. For this purpose a rehalogenizing bleach is used. To prevent an irreversible destruction of the dyes, the bleach formula must be either non-acidid or only slightly so. Widely used bleaches of this type are based on ferricyanide and bromide. The reaction takes place in three stages:

$Ag + [Fe(CN)_6]^{3-} \rightleftharpoons Ag^+ + [Fe(CN)_6]^{4-}$

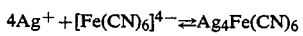
$4Ag^+ + [Fe(CN)_6]^{4-} \rightleftharpoons Ag_4Fe(CN)_6$

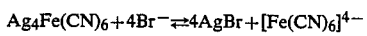
$Ag_4Fe(CN)_6 + 4Br^- \rightleftharpoons 4AgBr + [Fe(CN)_6]^{4-}$

The first stage in this sequence is the slowest and hence rate-determining stage. This rate depends directly on the potassium ferricyanide concentration so that with increasing ferrocyanide in the bath a slow-down of the process will occur until the further use of the solution becomes impractical. Potassium ferricyanide is one of the more expensive inorganic chemicals used in photographic processing and several methods have been suggested to rejuvenate the bath by oxidizing the ferrocyanide back to the ferric complex. This can be done by addition of bromine which then performs the dual function of oxidizing the ferrocyanide and replacing the bromide ions lost to the silver:

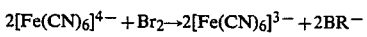
$2[Fe(CN)_6]^{4-} + Br_2 \rightarrow 2[Fe(CN)_6]^{3-} + 2BR^-$

Other advantages of this method are that no superfluous chemicals are added and that the rejuvenated bath is not seriously diluted.

Inspite of the chemical simplicity of the bromine method, the hazards of handling elementary bromine has led to the use of other oxidants. Persulphates for example are very suitable and safer to handle. The ensuing bromide deficiency must be made up by the addition of potassium bromide when the oxidation is completed.

After the halogenizing bleach has been accomplished the silver halide is removed by means of a thiosulfate or thiocyanate solution from which it can be recovered electrolytically or by metal exchange.

Bleach-fixing solutions combine both oxidation of metallic silver to silver halide and the elution of the halide from the emulsion with the same chemical bath. Since the eluting agents thiosulfate or thiocyanate are easily oxidized by the ferricyanide, the latter compound must be replaced with a chemical with which the ferric-ferrous system still functions but without the harmful oxidizing effect on the fixer. This can be accomplished with iron complexed with ethylenediaminetetraacetic acid:

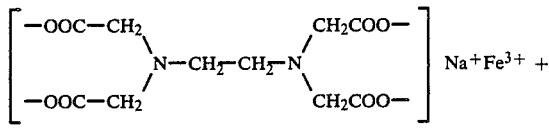

3 $H_2O$

In this chemical the ferric ion is also co-ordinated with the nitrogen atom.

Bleach-fixing solutions are slower in their bleaching action than rehalogenating baths although the separate fixing stage is eliminated. Regardless, the longer bleaching times are economically disadvantageous. Certain organic selenium compounds can speed up the bleaching action but increase the cost of the bath. In addition rejuvenating the bath requires a forced aeration.

The recovery of silver from discarded films and paper is more complex, since solid wastes are more difficult to handle and the silver is harder to separate from the base materials. For these reasons the silver recovery from these wastes has not yet received the attention which it deserves under the present circumstance of growing silver shortages. Because of the complex methods involved, recovery from these materials is generally done by specialists who buy discarded silver-containing scrap. In this manner, sufficient quantities of discarded material can be amassed for treatment to make silver recovery economical as long as the cost of collecting and transporting the material to the recovery site does not become excessive. Often some scrap material may contain confidential information and, therefore, cannot be removed from the premises unless it is first shredded.

The value of these wastes with respect to their silver content is estimated, often to the financial disadvantage of the seller, since the collector rather under-estimates the actual silver content.

Once the scrap is collected, a number of methods is used by commercial recovery specialists to separate the silver from it. The most common technique is to cautiously burn the scrap and to recover the silver from the ash by conventional metallurgical methods. The incinerators must be carefully designed to avoid environmental pollution and loss of silver with the flu gases. A recent paper by J. Piper and T. W. Ewell deals with these details.

The second method commonly used for the recovery of silver or silver halides from film and paper is based on the digestion of the gelatin emulsion by means of enzymes, or removal with warm soda ash, caustic or sodium hypochlorite solutions. The silver and silver halides are caused to collect on the bottom of the process vessel. This separation is often a difficult and tedious job, because of the formation of aqueous dispersions containing gelatin and colloidal silver halides. Once the solids have settled, they are collected through filtration or centrifugation, washed and dried and finally sent to a refiner. Since ferric chloride is known for use in sewage to settle colloidal matter, this principle has been applied in Czechoslovakian Patent No. 108,298 published Sept. 5, 1963. By utilizing $FeCl_3$ under basic (pH 8) conditions, it causes the colloidal silver and silver halides to coagulate and drop out, speeding up this silver recovery process.

Other chemical methods have been proposed for the purpose of likewise preserving the base film material for reuse, for example sodium cyanide and nitric acid. These are dangerous chemicals and must be handled with care in case the processor is willing to deal with the risks involved.

The above recovery systems are not always available to the smaller industrial consumer of photographic film and paper. Their amount of waste is too small for the collector and will consequently be discarded without recovering the silver. In view of the increasing scarcity and higher price of the metal a practical and economic recovery system for this silver from film and paper waste accessible to and affordable by the smaller operators is, therefore, highly desirable and much needed.

For a "do-it-yourself" process the Eastman-Kodak Company recommends as the most practical method for removing silver from scrap film their Kodak Flexicolor Bleach Replenisher which bleaches the silver, followed by a water wash and treatment in a standard thiosulfate fixer. The bleach contains the above mentioned ethylenediamine/tetra/acetic/acid-iron chelate. It oxidizes the silver forming an insoluble complex which remains in the emulsion. After a water wash the fixer elution transforms the insoluble complex into the water soluble thiosulfate or thiocyanate silver complex. Final recovery is made by means of metal exchange or elctrolysis. Although this method may be acceptable under certain circumstances, it has not generally been accepted because it is still comparatively slow in performance and the iron chelate used in the bleaching operation is an expensive reagent.

The cupric/cuprous system is also a redox system and the basis for a bleaching process:

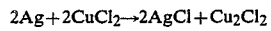

It must be carried out in highly acid solution to avoid hydrolysis of the copper salts, and the bleach contains up to 10% concentrated hydrochloric acid. This process is unacceptable for the on location processor, since in particular the handling of concentrated hydrochloric acid is dangerous, and since copper salts are poisonous and cannot be discarded into the sewer under today's environmental regulations.

Brief Description

The present invention is based on the use of ferric chloride which has been found to be an almost ideal solution for the problems which confront the practitioner when considering on-location silver recovery from photographic film and paper waste as described above. With an appropriate processor the use of this chemical provides a process which is:
automatic,
fast,
easy to handle,
non-toxic,
environmentally acceptable,
without effluent restrictions,
economical in cost, allowing 99% silver recovery and
yielding re-usable stripped film or paper base,
in short allowing independence from the silver recovery specialists, adding income to the business and increasing the supply of a scarce raw material.

DESCRIPTION OF THE PREFERRED EMBODIMENT

The basic chemical reaction for silver recovery with ferric chloride is shown by this simplified equation:

$$1Ag + 1FeCl_3 \rightarrow 1AgCl + 1FeCl_2$$

One mol of ferric chloride should produce one mol of metallic silver. Actually, however, our studies have shown that two and a half mols of silver are obtained before the processing bath becomes sluggish. This indicates that more than two of the chlorine atoms in the ferric chloride are available for the oxidation. The chlorine ions consumed by the silver are obviously replaced with hydroxyls originating from the dissociation of water. The corresponding protons control the acidity of the system. For the oxidation of the silver to progress, the ferrous iron will have to revert to the ferric state. This seems to happen when the processing bath in the machine comes into contact with air.

Hydration of the iron chlorides occurs in aqueous solution forming highly complicated molecules. Again the following equations have been simplified:

$$4\ \overset{II}{[Fe(H_2O)_6]}Cl_2 + O_2 + 4H_2O = 4\ \overset{III}{[Fe(H_2O)_6]}^{Cl_2}_{CH} + 2H_2O$$

$$4Ag + 4\ \overset{III}{[Fe(H_2O)_6]}^{Cl_2}_{CH} \neq 4AgCl + 4\ \overset{II}{[Fe(H_2O)_6]}^{Cl}_{CH}$$

$$4\ \overset{II}{[Fe(H_2O)_6]}^{Cl}_{CH} + O_2 + 4H_2O = 4\ \overset{III}{[Fe(H_2O)_6]}^{Cl}_{CH_2} + 2H_2O$$

$$4Ag + 4\ \overset{III}{[Fe(H_2O)_6]}^{Cl}_{CH_2} \neq 4AgCl + 4\ \overset{II}{[Fe(H_2O)_6]}CH_3$$

The efficiency of this rehalogenation bath is further enhanced by the ease of rejuvenating the system through air oxidation. The agitation of the bath created by the movement of the film or paper through the oxidizing compartment suffices, again making the operation very simple, since no additional machinery is needed for a forced aeration.

The stoichiometric equations explain the formation of insoluble iron hydroxides which can appear in the wash tank when the pH rises above 1. Thus, it is most preferred to use a pH of up to about 1, limited primarily by the resistance of processing equipment to strongly acid solutions. At pH of about 2, the amount of insoluble hydroxide formed starts to present difficulties for automatic processing. At about pH 3, when about at 10–20% ferric chloride solution is used, the formation of ferric hydroxide becomes unacceptable. Addition of hydrochloric acid to the oxidizing bath will retard the formation of these oxides. Additionally, hydrochloric acid also prolongs the bath life by replenishing the chlorine ions which had been consumed by the silver. On the other hand, excess hydrochloric acid can have a detrimental effect on the silver recovery. It increases the solubility of silver halides in the oxidizing bath, and this silver is lost when the bath is dumped. Since, however, ferric chloride is comparatively inexpensive, and since this process recovers large amounts of silver per charge of ferric chloride, rejuvenation of the bath is not needed, and the exhausted fluid can be discharged directly into the sewer. This residual iron chloride is actually helping the sewage plant where it is used as a flocculant. The process does not represent an environmental problem. In other words, the use of ferric chloride properly diluted is recommended for this process and no specific controls or chemical adjustments of the oxidizing bath are required. Of course, by using lower initial ferric chloride solutions, one can use higher pH solutions with less ferric hydroxide precipitation, as long as the solution remains acidic. However, this is done at a cost of time for the oxidation to occur and bath capacities. In view of the present low cost of materials, the preferred parameters are most practical for best results. There are also accelerators which can be used with the ferric chloride solution to speed up the oxidation of the silver, should this be desirable, like for example ammonium chloride.

The second step in this silver recovery process is a wash with tap water to remove residual oxidizing bath from the rehalogenated films and paper to prevent polluting of the silver halide elution bath containing the thiosulfate or thiocyanate. This is the standard "fixing" process which removes the silver halides as a water soluble complex. The fact that the metallic silver had been transformed into silver chloride speeds up this elution process due to the fact that it dissolves faster than the corresponding silver bromide predominantly present in most of the virgin photographic film or paper.

Having taken the precaution to wash the films and paper before introducing them into the fixing bath a closed loop can be set up for the fixing solution running through an electrolytic silver recovery unit. This allows a continuous removal of the silver from the fixer solution, cutting down on effluent which would waste silver and chemicals. This arrangement likewise contributes to the efficiency of the process which is able to recover 99% of the silver contained in the original photographic waste.

Commercial silver recovery units using this process are available. They are self-contained, requiring only a simple water line and drain and electrical power. The three processing tanks are positioned side by side and the silver electroplating unit is installed in the same housing. An automatic film feeding device allows feeds of up to 40 lbs. of presorted, prestacked film and paper without operator assistance. The machine can also be rigged for continuous feed of movie film, or rolls of film or photopaper up to the width of the transport mechanism.

The oxidizing solution contains preferably 10 to 20% by weight ferric chloride (FeCl$_3$) with 15 to 17% or about 16% ferric chloride solution found to give optimum results from a practical point of view. Even at 1% solutions of ferric chloride usable oxidation rates occur, although for automated operation, this concentration slows down the speed of oxidation too much for practical purposes. Concentrations as high as about 26% ferric chloride are usable.

As mentioned before the pH is self-controlling and no other adjustments of the bath are needed. When the clarity of the stripped sheets decreases indicating that the prevailing machine speed is too fast for the oxidation process, the speed can be reduced or the oxidizing bath can be re-charged. Alternatively, if desired, hydrochloric acid (HCl) can be added to reform ferric chloride from the ferric hydroxide formed by the process. However, the costs of the materials is so little as to make HCl rejuvenation unnecessary as a practical matter. Elevated bath temperatures will also increase the oxidation rate. Temperatures of up to about 50° C. to (122° F.) and especially about 35°–40° C. (95°–104° F.) are most preferred as a balance between increased oxidation rate and the maintenance of temperature conditions. Also, at higher temperatures, evaporation of solution can cause difficulties.

The automatically fed film and paper travel through the three processing tanks at a speed of only ninety seconds after which the materials devoid of silver drop into a collection compartment for recovery of the plastic or paper bases A silver recovery unit running on 6 gallons of oxidizing fluid containing about 16% ferric chloride and a temperature of about 38° C. (100° F.) has been found for example to be able to recover 200 troy ounces of silver from 900 lbs. of lithofilm or 6000 sheets sized 14"×17" in 2 weeks with five 7 hour days per week. The recovery is about 99% of the silver contained in the scrap.

It will be understood that the specification and examples are illustrative but not limitative of the present invention and that other embodiments within the spirit and scope of the invention will suggest themselves to those skilled in the art.

What is claimed is:

1. In a process for recovering silver from the emulsion of photographic materials, of the type wherein silver in the emulsion is oxidized and thereafter disolved to form a solution from which the silver is recovered by a reduction process, the improvement wherein the step of oxidizing the silver comprises treating the photographic materials with an acid solution of from about 10% to about 26% ferric chloride at a pH of up to about 2.

2. The process of claim 1 wherein the ferric chloride solution contains from about 10% to about 20% ferric chloride.

3. The process of claim 2 wherein the ferric chloride solution contains about 15% to 17% ferric chloride.

4. The process of claim 3 wherein about 16% ferric chloride solution is used.

5. The process of claim 1 wherein a pH of about 1 and a ferric chloride concentration of 10% to 20% are used.

6. The process of claim 5 wherein the ferric chloride solution temperature is maintained up to 50° C.

7. The process of claim 6 wherein a temperature of about 35°–40° C. is maintained.

8. The process of claim 6 wherein a temperature of about 38° C. (100° F.) is maintained 9. The process of claim 1 wherein the ferric chloride solution temperature is maintained up to about 50° C.

* * * * *

UNITED STATES PATENT AND TRADEMARK OFFICE
CERTIFICATE OF CORRECTION

PATENT NO. : 4,759,914

DATED : July 26, 1988

INVENTOR(S) : Harold Messerschmidt

It is certified that error appears in the above-identified patent and that said Letters Patent is hereby corrected as shown below:

Col. 5, lines 35, 38 and 40; In the formulae, the portions appearing as "CH", "$CH_2$" and "$CH_3$" should read --OH--, --$OH_2$--, --$OH_3$--, respectively.

Signed and Sealed this

Twenty-first Day of March, 1989

Attest:

DONALD J. QUIGG

*Attesting Officer*  *Commissioner of Patents and Trademarks*